(12) United States Patent
Choi et al.

(10) Patent No.: US 12,393,070 B2
(45) Date of Patent: Aug. 19, 2025

(54) DISPLAY DEVICE COMPRISING A STAND HAVING AN ELASTIC MEMBER DISPOSED BETWEEN A REAR LEG AND A FRONT LEG

(71) Applicant: LG ELECTRONICS INC., Seoul (KR)

(72) Inventors: Yongchai Choi, Seoul (KR); Kiyoon Nam, Seoul (KR); Sangmin Kim, Seoul (KR); Huisik Kim, Seoul (KR); Dabin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 18/111,013

(22) Filed: Feb. 17, 2023

(65) Prior Publication Data

US 2023/0266611 A1 Aug. 24, 2023

(30) Foreign Application Priority Data

Feb. 22, 2022 (KR) .......................... 10-2022-0023073

(51) Int. Cl.
*G02F 1/1333* (2006.01)
(52) U.S. Cl.
CPC .. *G02F 1/133322* (2021.01); *G02F 1/133314* (2021.01)
(58) Field of Classification Search
CPC ................................................. F16M 2200/02
See application file for complete search history.

(56) References Cited

U.S. PATENT DOCUMENTS

| 6,499,685 | B2 | 12/2002 | Morita et al. |
| 7,403,376 | B2 * | 7/2008 | Tsang ..................... F16M 11/10 |
| | | | 248/920 |
| 2017/0303413 | A1 | 10/2017 | Park et al. |
| 2018/0184534 | A1 | 6/2018 | Na et al. |
| 2019/0364675 | A1 * | 11/2019 | Lee ..................... H05K 5/0221 |
| 2021/0317945 | A1 | 10/2021 | Kim et al. |

FOREIGN PATENT DOCUMENTS

| JP | S57-70284 | 4/1982 |
| JP | 2001-034179 | 2/2001 |
| JP | 2007-164118 | 6/2007 |
| JP | 2008-096513 | 4/2008 |

(Continued)

OTHER PUBLICATIONS

Korean Intellectual Property Office Application No. 10-2022-0023073, Office Action dated Nov. 20, 2023, 5 pages.

(Continued)

*Primary Examiner* — Paul C Lee
(74) *Attorney, Agent, or Firm* — LEE, HONG, DEGERMAN, KANG & WAIMEY

(57) ABSTRACT

A display device is provided. The display device of the present disclosure includes: a head having a display panel; and a stand disposed adjacent to a first side of the head and supporting the head, wherein the stand includes: a body coupled to the head, the body having a front leg that protrudes forward from the body; a rear leg protruding rearward from the body; and an elastic member disposed between the rear leg and the front leg, coupled to the rear leg, and being stretchable in a front-rear direction.

13 Claims, 20 Drawing Sheets

(56) References Cited

FOREIGN PATENT DOCUMENTS

| | | |
|---|---|---|
| KR | 10-0373400 | 2/2003 |
| KR | 10-0693529 | 7/2006 |
| KR | 10-2021-0127402 | 10/2021 |
| WO | WO-2017214764 A1 * | 12/2017 |

OTHER PUBLICATIONS

Japan Patent Office Application No. 2023-009263, Office Action dated Jan. 9, 2024, 6 pages.
Korean Intellectual Property Office Application No. 10-2022-0023073, Notice of Allowance dated Jul. 3, 2024, 2 pages.
European Patent Office Application Serial No. 23155126.8, Search Report dated Jul. 3, 2023, 8 pages.
Japan Patent Office Application No. 2023-009263, Notice of Allowance dated Apr. 2, 2024, 3 pages.
IP Australia Application Serial No. 2023200887, Office Action dated Oct. 30, 2024, 7 pages.
European Patent Office Application Serial No. 23155126.8, Office Action dated Jul. 2, 2025, 6 pages.

* cited by examiner

DISPLAY DEVICE COMPRISING A STAND HAVING AN ELASTIC MEMBER DISPOSED BETWEEN A REAR LEG AND A FRONT LEG

CROSS-REFERENCE TO RELATED APPLICATION

Pursuant to 35 U.S.C. § 119(a), this application claims the benefit of earlier filing date and right of priority to Korean Patent Application No. 10-2022-0023073, filed on Feb. 22, 2022, the contents of which are hereby incorporated by reference herein in its entirety.

BACKGROUND OF THE INVENTION

1. Field of the Invention

The present disclosure relates to a display device.

2. Description of the Related Art

With the development of the information society, there have been growing demands for various types of display devices, and in order to meet these demands, various display devices, such as a liquid crystal display (LCD), a plasma display panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light emitted from a backlight unit. Further, the OLED panel may display images by depositing a self light-emitting organic layer on a substrate, on which transparent electrodes are formed.

Many studies have been conducted recently on a structure for allowing a display device to be in close contact with a wall.

SUMMARY OF THE INVENTION

It is an object of the present disclosure to solve the above and other problems.

It is another object of the present disclosure to provide a display device including a stand for supporting a head having a display panel.

It is yet another object of the present disclosure to provide a display device in which as the stand is in contact with a wall and is moved closer to the wall, a distance between the head and the wall may decrease.

It is yet another object of the present disclosure to provide a display device in which as the stand, while in contact with the wall, is moved further away from the wall, a sliding assembly of the stand which is in contact with the wall may become longer.

It is yet another object of the present disclosure to provide an elastic deformation mechanism of the stand.

It is yet another object of the present disclosure to provide a coupling structure of the head and the stand.

In accordance with an aspect of the present disclosure, the above and other objects can be accomplished by providing a display device including: a head having a display panel; and a stand disposed adjacent to a first side of the head and supporting the head, wherein the stand includes: a body coupled to the head, the body having a front leg that protrudes forward from the body; a rear leg protruding rearward from the body; and an elastic member disposed between the rear leg and the front leg, coupled to the rear leg, and being stretchable in a front-rear direction.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
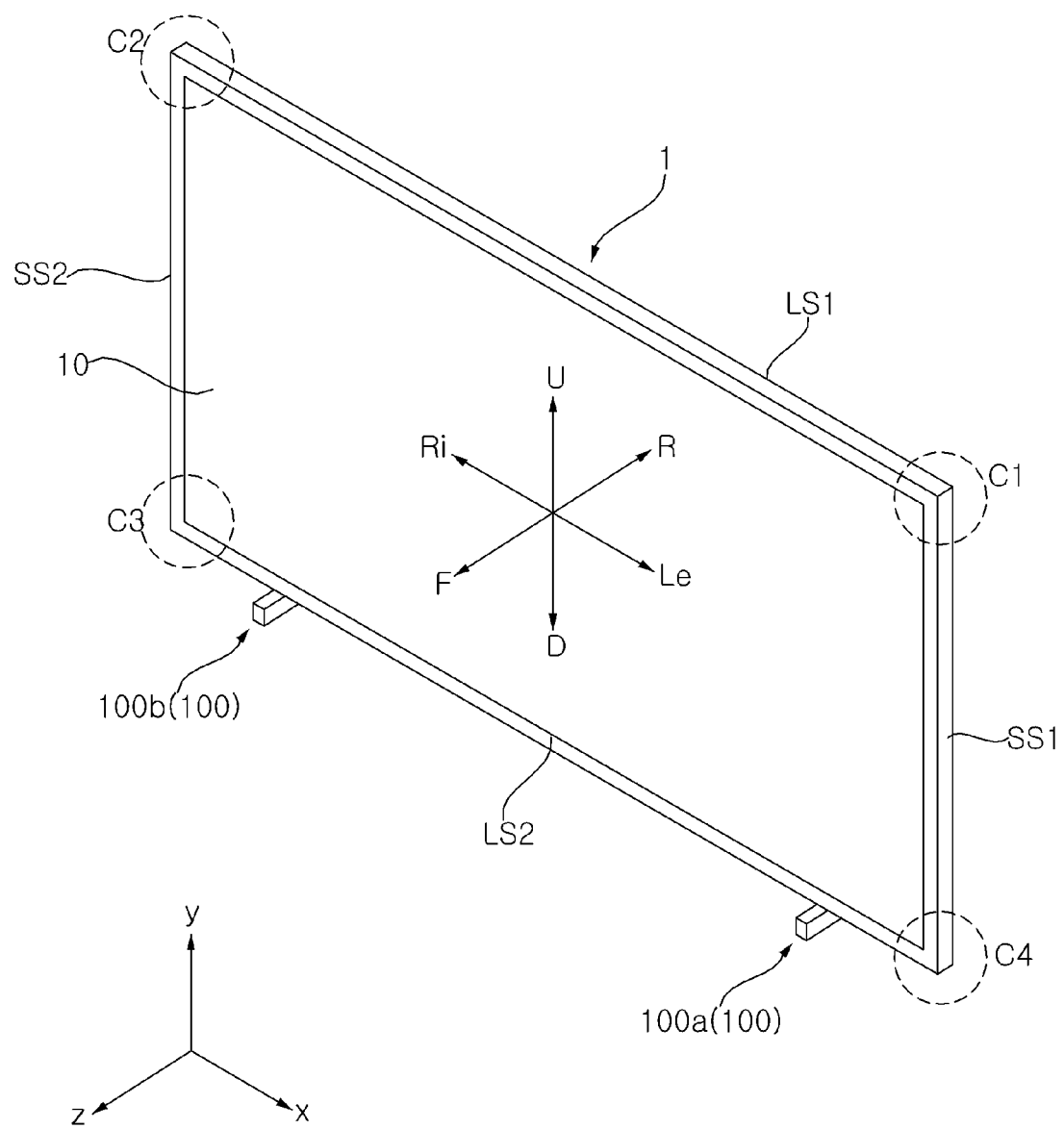
FIGS. 1 to 20 are diagrams illustrating examples of a display device according to embodiments of the present disclosure.

Hereinafter, the present disclosure will be described in detail with reference to the accompanying drawings, in which the same reference numerals are used throughout the drawings to designate the same or similar components, and a redundant description thereof will be omitted.

The terms "module" and "unit" for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the invention. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

In the embodiments illustrated in the figures, representations of directions such as up (U), down (D), left (Le), right (Ri), front (F), and rear (R) are merely for convenience of explanation, and the technical scope of the present disclosure is not limited thereto.

In the following description, a display panel according to the present disclosure is an LCD panel (see FIGS. 1 to 3) or an OLED panel (see FIG. 4), but the type of display panel applicable to the present disclosure is not limited thereto.

Referring to FIG. 1, a display device 1 may include a display panel 10. The display panel 10 may display images.

The display panel 10 may include a first long side LS1, a second long side LS2 opposite to the first long side LS1, a first short side SS1 adjacent to the first long side LS1 and the second long side LS2, and a second short side SS2 opposite to the first short side SS1. For convenience of explanation, it is illustrated and described that the first and second long sides LS1 and LS2 are longer than the first and second short sides SS1 and SS2, but there may also be a case in which lengths of the first and second long sides LS1 and LS2 may be approximately equal to lengths of the first and second short sides SS1 and SS2.

A direction parallel to the long sides LS1 and LS2 of the display device 1 may be referred to as a left-right direction. A direction parallel to the short sides SS1 and SS2 of the display device 1 may be referred to as an up-down direction. A direction perpendicular to the long sides LS1 and LS2 and the short sides SS1 and SS2 of the display device 1 may be referred to as a front-rear direction.

A side on which the display panel 10 displays an image may be referred to as a front side F, z, and a side opposite thereto may be referred to as a rear side R. The first long side LS1 may be referred to as an upper side U, y, and the second long side LS2 may be referred to as a lower side D. The first short side SS1 may be referred to as a left side Le, x and the second short side SS2 may be referred to as a right side Ri.

The first long side LS1, the second long side LS2, the first short side SS1, and the second short side SS2 may be referred to as edges of the display device 1. Further, positions where the first long side LS1, the second long side LS2, the first short side SS1, and the second short side SS2 meet each other may be referred to as corners.

For example, a position where the first short side SS1 and the first long side LS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

Figure 2:
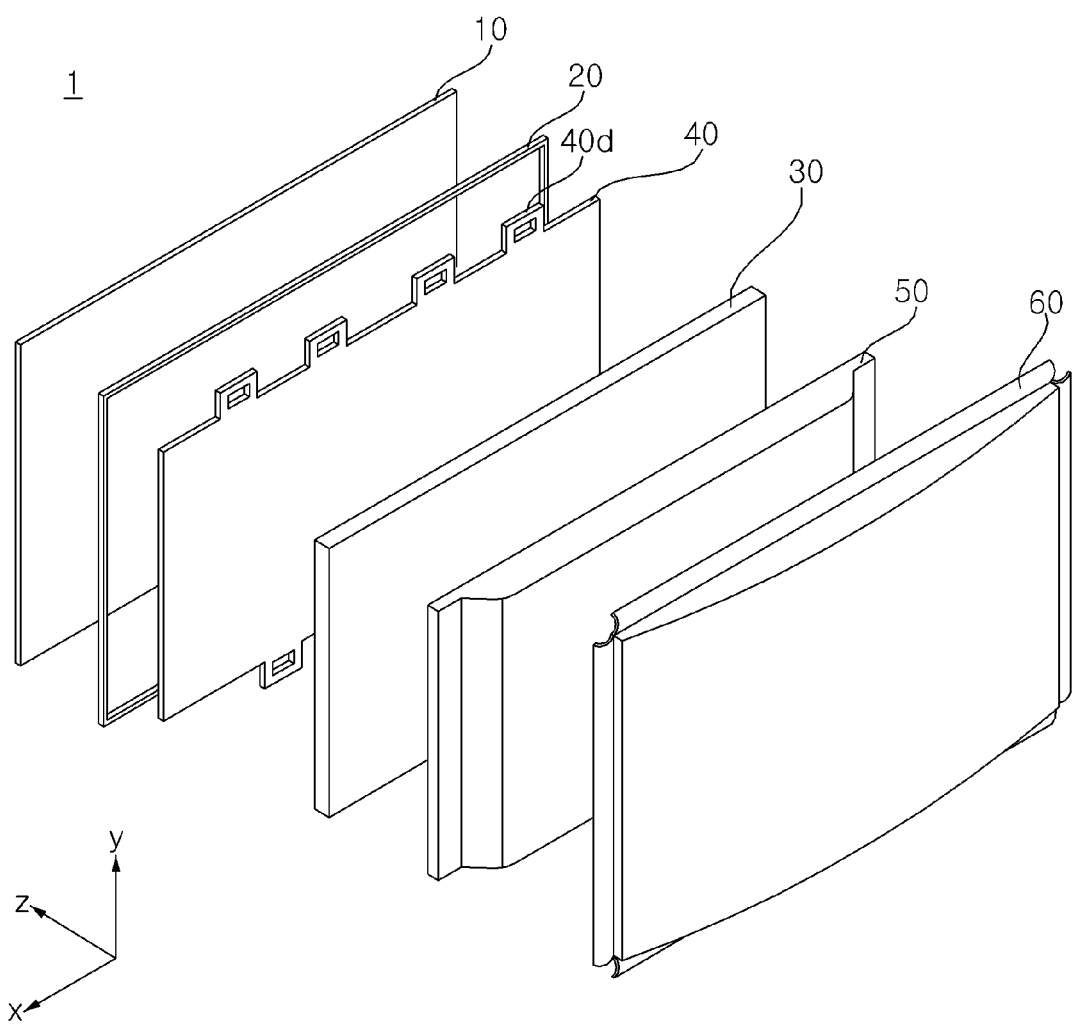

Referring to FIG. 2, the display device 1 may include the display panel 10, a guide panel 20, backlight units 30 and 40, a frame 50, and a back cover 60.

The display panel 10 may form a front surface of the display device 1 and may display images. The display panel 10 may display images with each of a plurality of pixels having Red, Green, and Blue (RGB) values output according to timing. The display panel may be divided into an active area, in which the image is displayed, and a de-active area in which the image is not displayed. The display panel 10 may include a front substrate and a rear substrate which are disposed opposite each other with respect to a liquid crystal layer interposed therebetween. The display panel 10 may be referred to as an LCD panel.

The front substrate may include a plurality of pixels, each including Red (R), Green (G), and Blue (B) subpixels, and may generate an image corresponding to red, green, or blue color in response to a control signal.

The rear substrate may include switching elements. The rear substrate may switch pixel electrodes. For example, the pixel electrodes may change a molecular arrangement of a liquid crystal layer in response to a control signal applied from the outside. The liquid crystal layer may include a plurality of liquid crystal molecules. The arrangement of the liquid crystal molecules may be changed in response to a difference in voltage applied between the pixel electrode and the common electrode. The liquid crystal layer may transfer light, generated from the backlight units 30 and 40, to the front surface or may block the light.

The guide panel 20 may surround the periphery of the display panel 10 and may cover a lateral surface of the display panel 10. The guide panel 20 may be coupled to the display panel 10 or may support the display panel 10. The guide panel 20 may be referred to as a frame or a middle cabinet.

The backlight units 30 and 40 may be disposed at the rear of the display panel 10. The backlight units 30 and 40 may include light sources. The backlight units 30 and 40 may be coupled to the frame 50 at the front of the frame 50. The backlight units 30 and 40 may be driven by an entire driving method or a partial driving method such as a local dimming method, an impulsive driving method, and the like. The backlight units 30 and may include an optical sheet 40 and an optical layer 30.

The optical sheet 40 may enable light from the light sources to be uniformly transmitted to the display panel 10. The optical sheet 40 may include a plurality of layers. For example, the optical sheet 40 may include a prism sheet or a diffusion sheet. Meanwhile, a coupling part 40d of the optical sheet 40 may be coupled to the frame 50 and/or the back cover 60.

The frame 50 may be disposed at the rear of the backlight units 30 and 40, and may support the components of the display device 1. The edges of the frame 50 may be fixed to the guide panel 20. For example, the backlight units 30 and 40, a Printed Circuit Board (PCB) on which a plurality of electronic elements are mounted, and the like may be coupled to the frame 50. For example, the frame 50 may include a metal material. The frame 50 may be referred to as a main frame, a module cover, or a cover bottom.

The back cover 60 may cover the rear side of the frame 50. The back cover 60 may be coupled to the frame 50. For example, the back cover 60 may include a metal material.

Figure 3:
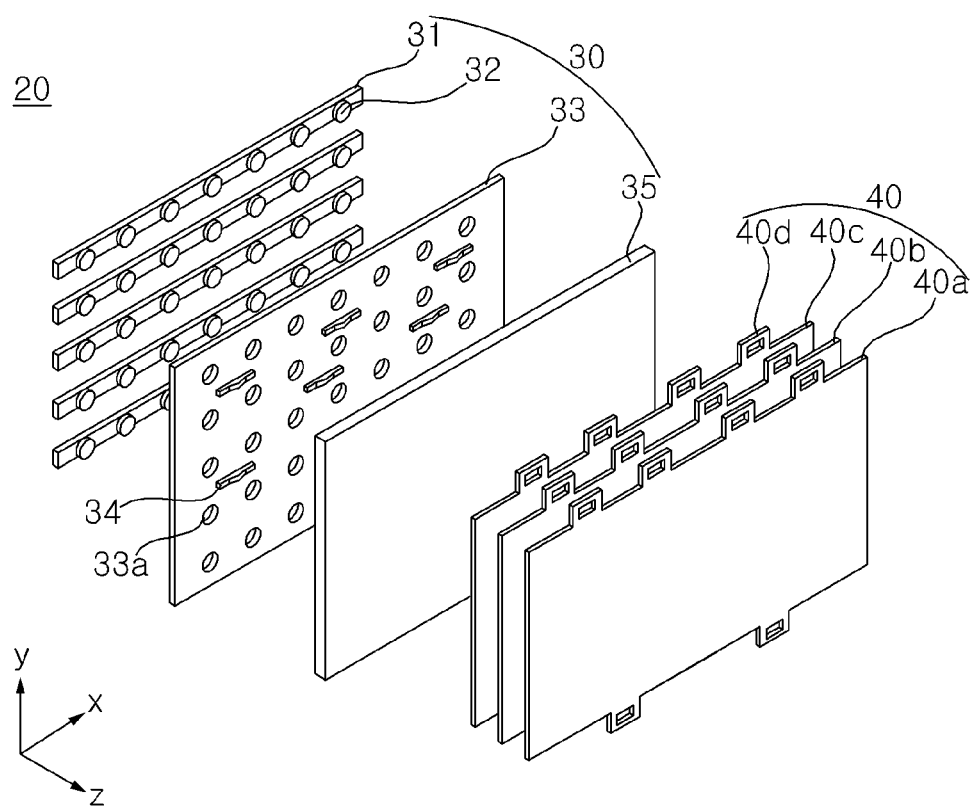

Referring to FIG. 3, the optical layer 30 may include a substrate 31, at least one light assembly 32, a reflective sheet 33, and a diffusion plate 35. The optical sheet 40 may be disposed at the front of the optical layer 30.

The substrate 31 may be formed in the shape of a plurality of straps which extend in a left-right direction and are spaced apart from each other in the up-down direction. The at least one light assembly 32 may be mounted on the substrate 31. An electrode pattern is formed on the substrate 31 to connect an adapter and the light assembly 32. For example, the electrode pattern may be a carbon nanotube electrode pattern. The substrate 31 may be made of at least one of polyethylene terephthalate (PET), glass, polycarbonate (PC), and silicon. The substrate 31 may be a PCB on which the at least one light assembly 32 is mounted.

The light assembly 32 may be a light emitting diode (LED) chip or a light emitting diode package including at least one LED chip. The light assembly 32 may be a colored LED emitting at least one of red, green, and blue light or a white LED. The colored LED may include at least one of a red LED, a green LED, and a blue LED.

The reflective sheet 33 may be disposed at the front of the substrate 31. At least one hole 33a may be formed by passing through the reflective sheet 33, and the light assembly 32 may be disposed in the hole 33a. The reflective sheet 33 may forwardly reflect light emitted from the light assembly 32 or light reflected from the diffusion plate 35. For example, the reflective sheet 33 may include metal and/or metal oxide having high reflectance, such as at least one of aluminum (Al), silver (Ag), gold (Au), and titanium dioxide (TiO2).

Further, an air gap may be positioned between the reflective sheet 33 and the diffusion plate 35. The air gap may serve as a buffer capable of widely spreading light emitted from the light assembly 32. A supporter 34 may be disposed between the reflective sheet 33 and the diffusion plate 35, so as to keep the air gap.

The diffusion plate 35 may be disposed at the front of the reflective sheet 33. The diffusion plate 35 may be disposed between the reflective sheet 33 and the optical sheet 40.

The optical sheet 40 may include at least one sheet. For example, the optical sheet may include one or more prism sheets and/or one or more diffusion sheets. A plurality of sheets included in the optical sheet 40 may be bonded to each other or may be in close contact with each other.

Specifically, the optical sheet 40 may include a plurality of sheets having different functions. For example, the optical sheet 40 may include a first optical sheet 40a, a second optical sheet 40b, and a third optical sheet 40c. For example, the first optical sheet 40a is a diffusion sheet, and the second optical sheet 40b and the third optical sheet 40c may be prism sheets. The diffusion sheet may prevent light emitted from the diffusion plate 35 from being partially concentrated, so that light may be distributed uniformly. The prism sheet may concentrate light emitted from the diffusion sheet and may redirect light to the display panel 10. The number and/or position of the diffusion sheet and prism sheet may vary.

Figure 4:
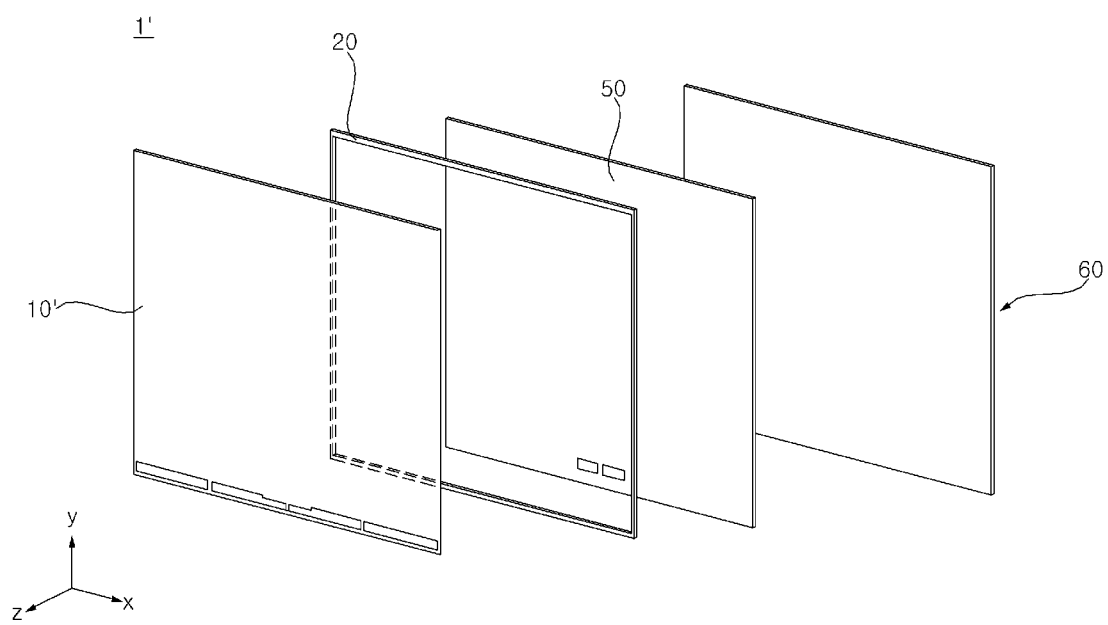

Referring to FIG. 4, a display device 1' may include a display panel 10', the guide panel 20, the frame 50, and the back cover 60.

The display panel 10' may form a front surface of the display device 1' and may display images. The display panel 10' may divide the image into a plurality of pixels and may output the image while controlling color, brightness, and chroma of the respective pixels. The display panel 10' may be divided into an active area, in which the image is displayed, and a de-active area in which the image is not displayed. The display panel 10' may generate light corresponding to red, green, or blue color in response to a control signal. The display panel 10' may be referred to as an OLED panel.

The guide panel 20 may surround the periphery of the display panel 10' and may cover the lateral surface of the display panel 10'. The guide panel 20 may be coupled to the display panel 10' or may support the display panel 10'. The guide panel 20 may be referred to as a side frame or a middle cabinet.

The frame 40 may be disposed at the rear of the display panel 10' and may be coupled to the display panel 10'. The edges of the frame 50 may be fixed to the guide panel 20. Electronic components may be mounted to the frame 50. For example, the frame 50 may include a metal material. The frame 50 may be referred to as a main frame, a module cover, or a cover bottom.

The back cover 60 may cover the rear side of the frame 50. The back cover 60 may be coupled to the frame 50. For example, the back cover 60 may include a metal material.

Figure 5:
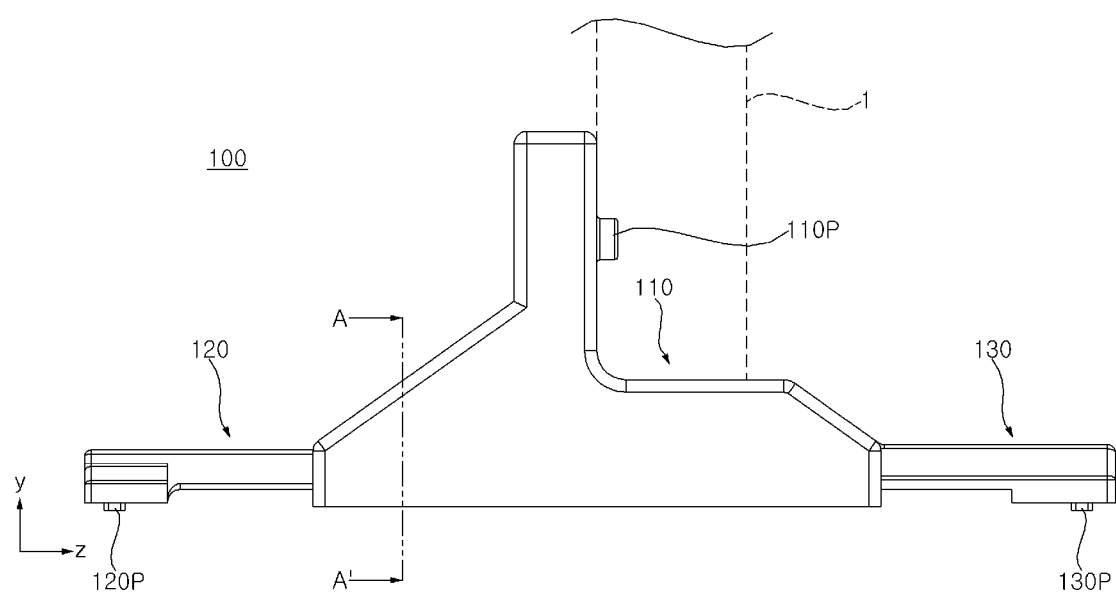

Referring to FIGS. 1 and 5, a stand 100 may be adjacent to a bottom side of the back cover 60 (see FIGS. 2 and 4) to be coupled to the back cover 60, and may support the display device 1. The stand 100 may be a component of the display device 1, and the display device 1, excluding the stand 100, may be referred to as a head 1.

For example, the stand 100 may include a plurality of stands 100a and 100b which are spaced apart from each other along the bottom side of the back cover 60. A first stand 100a may be adjacent to the bottom side and a left side of the back cover 60, and a second stand 100b may be adjacent to the bottom side and a right side of the back cover 60. Accordingly, the stand 100 may stably support the head 1.

Figure 6:
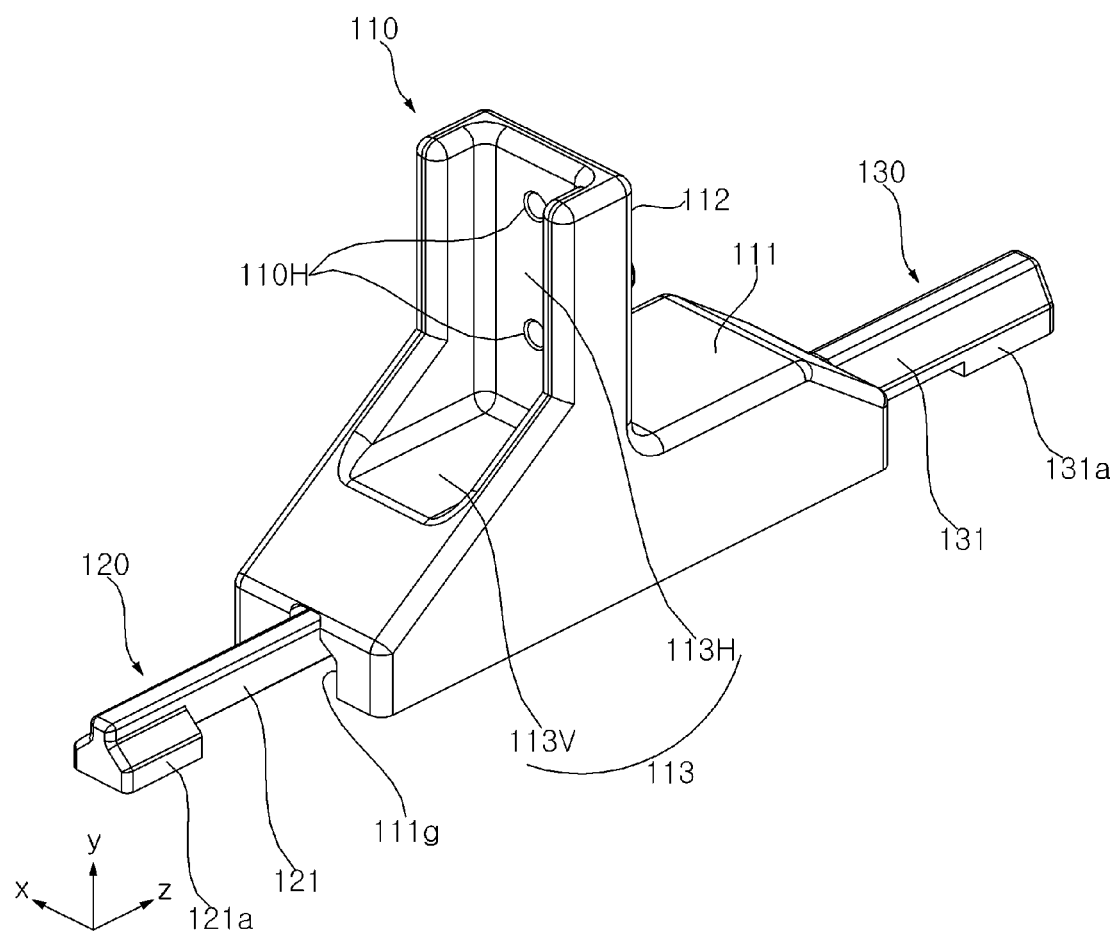

Referring to FIGS. 5 and 6, the stand 100 may include bodies 110 and 130 and a sliding assembly 120. The bodies 110 and 130 may include a first body 110 and a second body 130.

A support part 111 of the first body 110 may extend in the front-rear direction. A coupling part 112 of the first body 110 may extend upward from an upper end of the support part 111. A groove 113 may be formed at a position where the support part 111 and the coupling part 112 meet each other.

The second body 130 may extend forward from a front end of the support part 111. For example, the support part 111 and the second body 130 may be integrally formed as one body.

The sliding assembly 120 may be disposed opposite the second body 130 with respect to the first body 110. The sliding assembly 120 may be referred to as a moving assembly or an elastic body.

Figure 7:
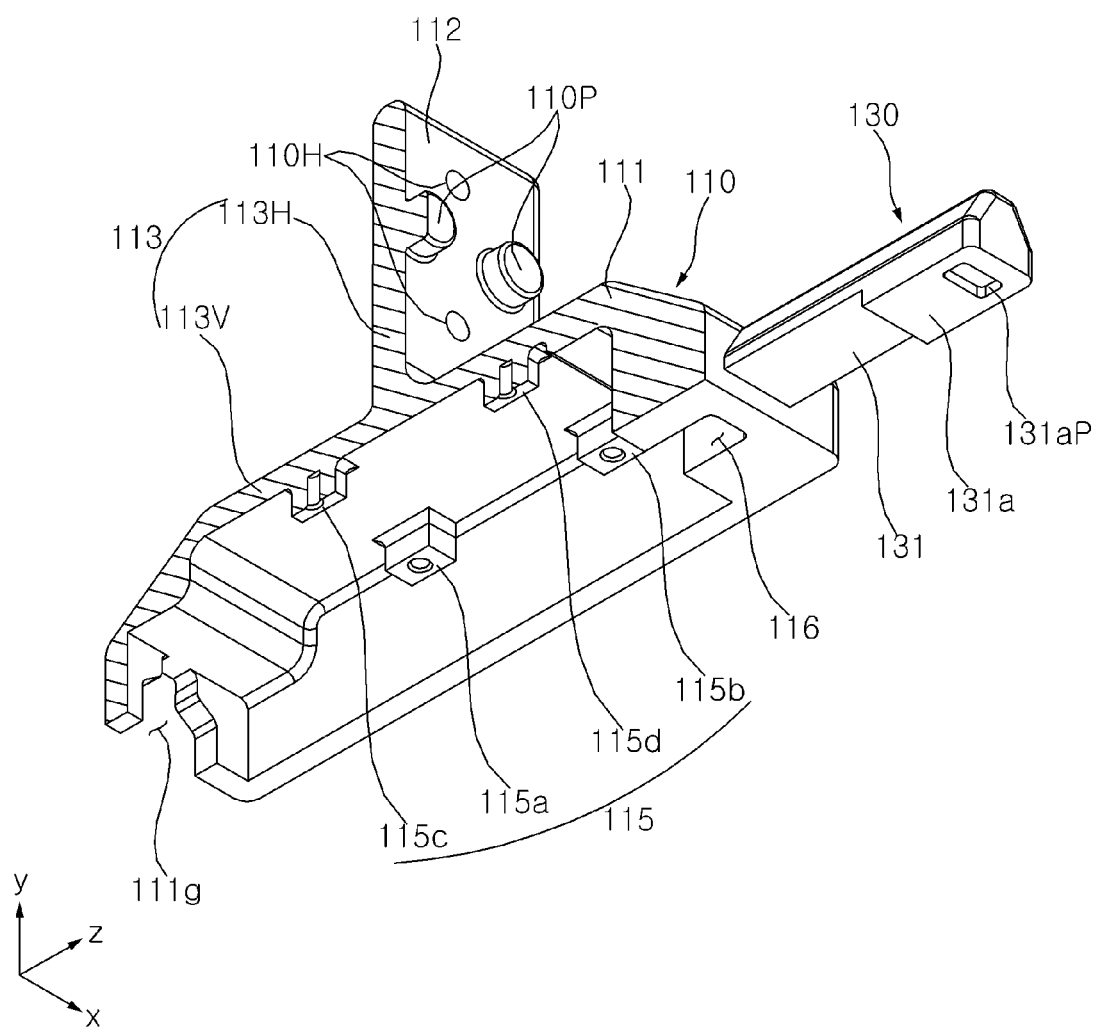

Referring to FIG. 7, a lower side of the support part 111 may be open. A slot 111g may be formed by passing through a rear end of the support part 111. A recess 116 may be opposite the slot 111g with respect to the opening of the support part 111. A plurality of fastening parts 115a, 115b, 115c, and 115d may be formed on a lower surface of the support part 111.

The coupling part 112 may be disposed at the center of the support part 111. A guide pin 110P may protrude forward from a front surface of the coupling part 112. A coupling hole 110H may be adjacent to the guide pin 110P and may be formed by passing through the coupling part 112 in the front-rear direction.

Accordingly, the guide pin 110P may be inserted into the back cover 60 (see FIGS. 2 and 4) of the head 1, and may guide coupling between the coupling part 112 and the back cover 60. A fastening member, such as a screw, may pass through the coupling hole 110H to be fastened to the back cover 60.

The second body 130 may include a front leg 131 extending in the front-rear direction. A front foot 131a may protrude downward from a lower surface of the front leg 131, and may have a pad recess 131aP into which a front pad 130P (see FIG. 12) is inserted. For example, the front pad 130P may include a buffer material such as rubber or silicon.

Figure 8:
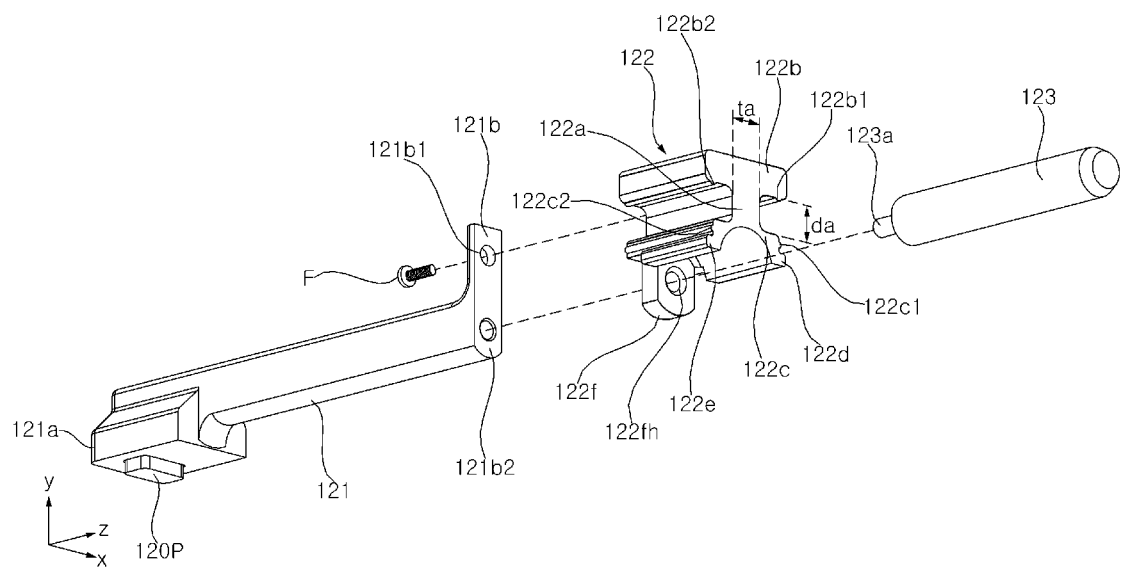

Referring to FIG. 8, the sliding assembly 120 (see FIG. 6) may include a rear leg 121 extending in the front-rear direction. A rear foot 121a may protrude downward from a lower surface of the rear leg 121, and may have a pad recess into which a rear pad 120P is inserted. For example, the rear pad 120P may include a buffer material such as rubber or silicon.

A first connection part 121b may be formed at a front end of the rear leg 121, and may include a fixing hole 121b1 and a fixing recess 121b2 which are spaced apart from each other in the up-down direction.

A slider 122 may include a first part 122a, a second part 122b, and a third part 122c. The first part 122a may extend in the front-rear direction and may form a minimum thickness to of the slider 122. The second part 122b may extend in the left-right direction from an upper end of the first part 122a. That is, the second part 122b and the first part 122a may have a generally T-shaped longitudinal cross-section. The third part 122c may extend in an arc from a lower end of the first part 122*a* in the left-right direction. That is, the third part 122*c* may be generally formed in the shape of a cylinder cut in half. In addition, a distance da between the third part 122*c* and the second part 122*b* may be equal to a height of the first part 122*a*.

Further, a second connection part 122*f* may be formed at a rear end of the slider 122 and may include a fixing recess 122*h* (see FIG. 16) and a fixing hole 121*fh* which are spaced apart from each other in the up-down direction. A fastening member F, such as a screw, may pass through the fixing hole 121*b*1 to be fastened to the fixing recess 122*h* of the second connection part 122*f*. Accordingly, the rear leg 121 may be coupled to the slider 122.

A rod 123 may extend in the front-rear direction. The rod 123 may have a cylindrical shape. The rod 123 may be disposed under the third part 122*c* and may have a curvature corresponding to a curvature of the third part 122*c*. A protrusion 123*a* may protrude rearward from a rear end of the rod 123 and may pass through the fixing hole 122*fh* to be inserted into the fixing recess 121*b*2 and fixed thereto. For example, the protrusion 123*a* may be press-fit into the fixing recess 121*b*.

Figure 9:
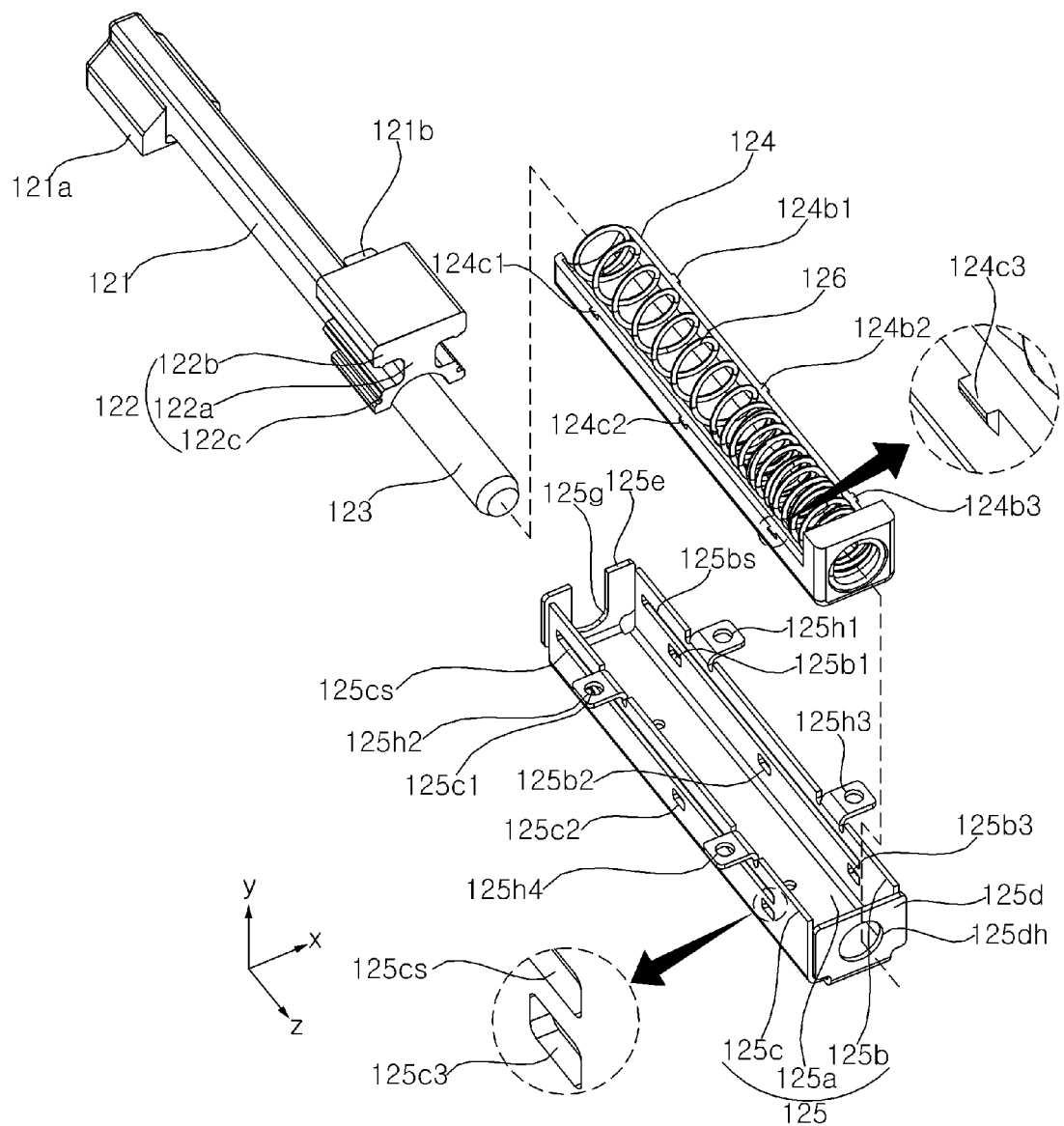

Referring to FIG. 9, an elastic member 126 may extend in the front-rear direction. At least a portion of the elastic member 126 may be wound in a coil shape around an outer circumference of the rod 123. In this manner, the elastic member 126 may be stably elastic-deformed or restored by the rod 123 in the front-rear direction. A portion of the elastic member 126 may be disposed under the third part 122*c* of the slider 122. The elastic member 126 may be a spring.

A guide frame 124 may be disposed under the elastic member 126 and may support the elastic member 126. An inner surface of the guide frame 124 may partially cover an outside of the elastic member 126. A front end of the elastic member 126 may be fixed to one side of the guide frame 124, and a rear end of the elastic member 126 may come into contact with the second connection part 122*f*. A frame hole (not numbered) may be formed on the one side of the guide frame 124 and may be aligned with the rod 123.

A bracket 125 may be disposed under the guide frame 124. A bottom part 125*a* may extend in the front-rear direction and may cover a lower side of the guide frame 124. A first side part 125*b* may be bent upward from a left side of the bottom part 125*a* and may cover a left side of the guide frame 124. A second side part 125*c* may be bent upward from a right side of the bottom part 125*a* and may cover a right side of the guide frame 124. A front part 125*d* may be bent upward from a front end of the bottom part 125*a* and may have a bracket hole 125*dh* aligned with the frame hole of the guide frame 124. A rear part 125*e* may be bent upward from a rear end of the bottom part 125*a* and may have a groove 125*g* through which the rear leg 121 passes.

A plurality of protrusions 124*b*1, 124*b*2, 124*b*3, 124*c*1, 124*c*2, and 124*c*3 may be formed on the left and right sides of the guide frame 124 and may be inserted into recesses 125*b*1, 125*b*2, 125*b*3, 125*c*1, 125*c*2, and 125*c*3 formed in the first side part 125*b* and the second side part 125*c*. Accordingly, the guide frame 124 may be disposed in the bracket 125 and may be snap-fit coupled to the bracket 125.

A first protrusion 122*d* may protrude from a first end of the third part 122*c* of the slider 122 in a radial direction of the third part 122*c*. A second protrusion 122*e* (see FIG. 8) may protrude from a second end of the third part 122*c* in the radial direction of the third part 122*c*.

A first groove 125*bs* may be formed in the first side part 125*b* and may extend in a longitudinal direction of the slider 122, and the first protrusion 122*d* may be movably inserted into the first groove 125*bs*. A second groove 125*cs* may be formed in the second side part 125*c* and may extend in a longitudinal direction of the slider 122, and the second protrusion 122*e* may be movably inserted into the second groove 125*cs*.

Accordingly, the slider 122 may be movably coupled to the inside of the bracket 125 in a longitudinal direction of the slider 122 or the bracket 125. In response to the movement of the slider 122, the elastic member 126 may be compressed or stretched.

Figure 10:
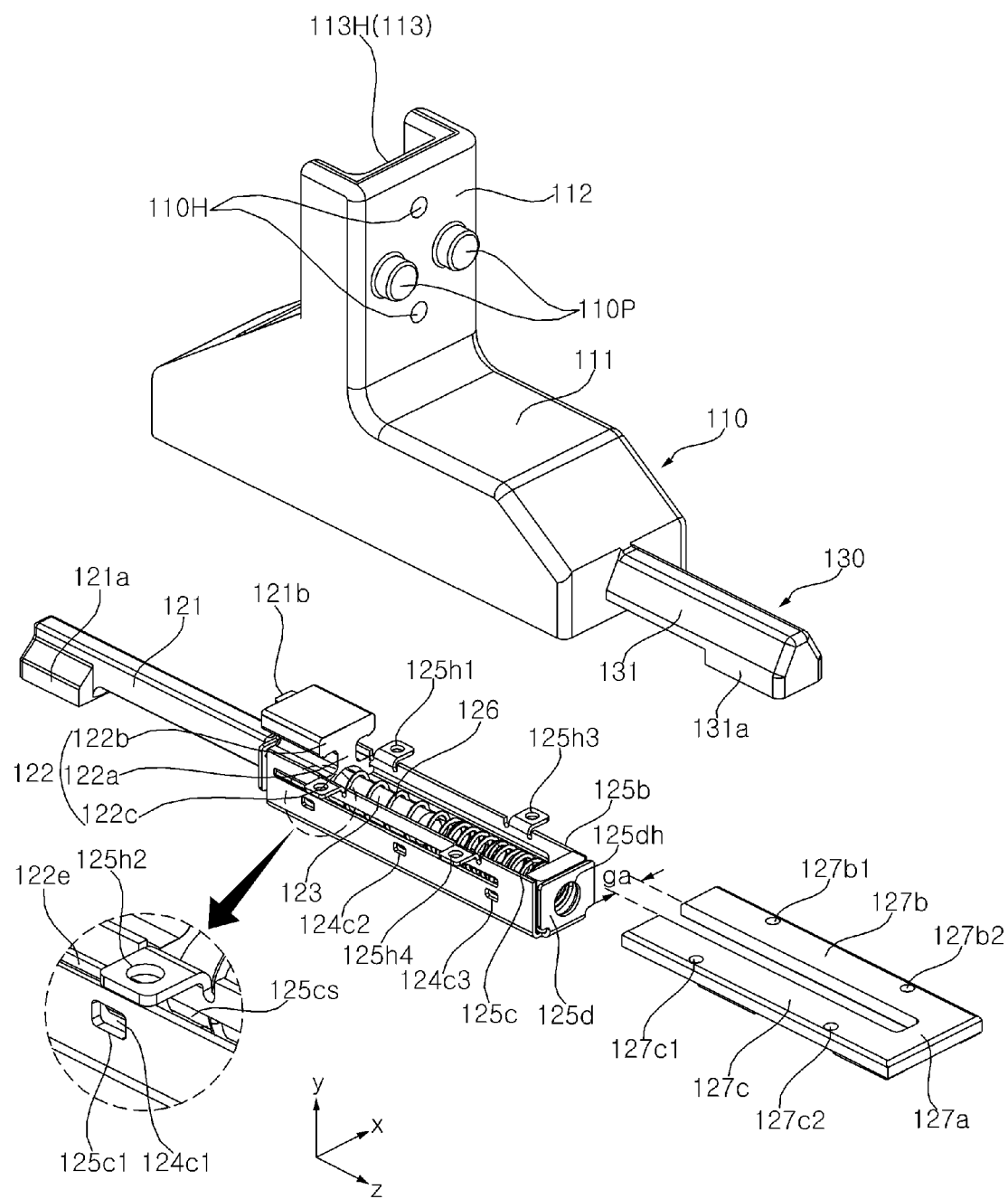
Figure 11:
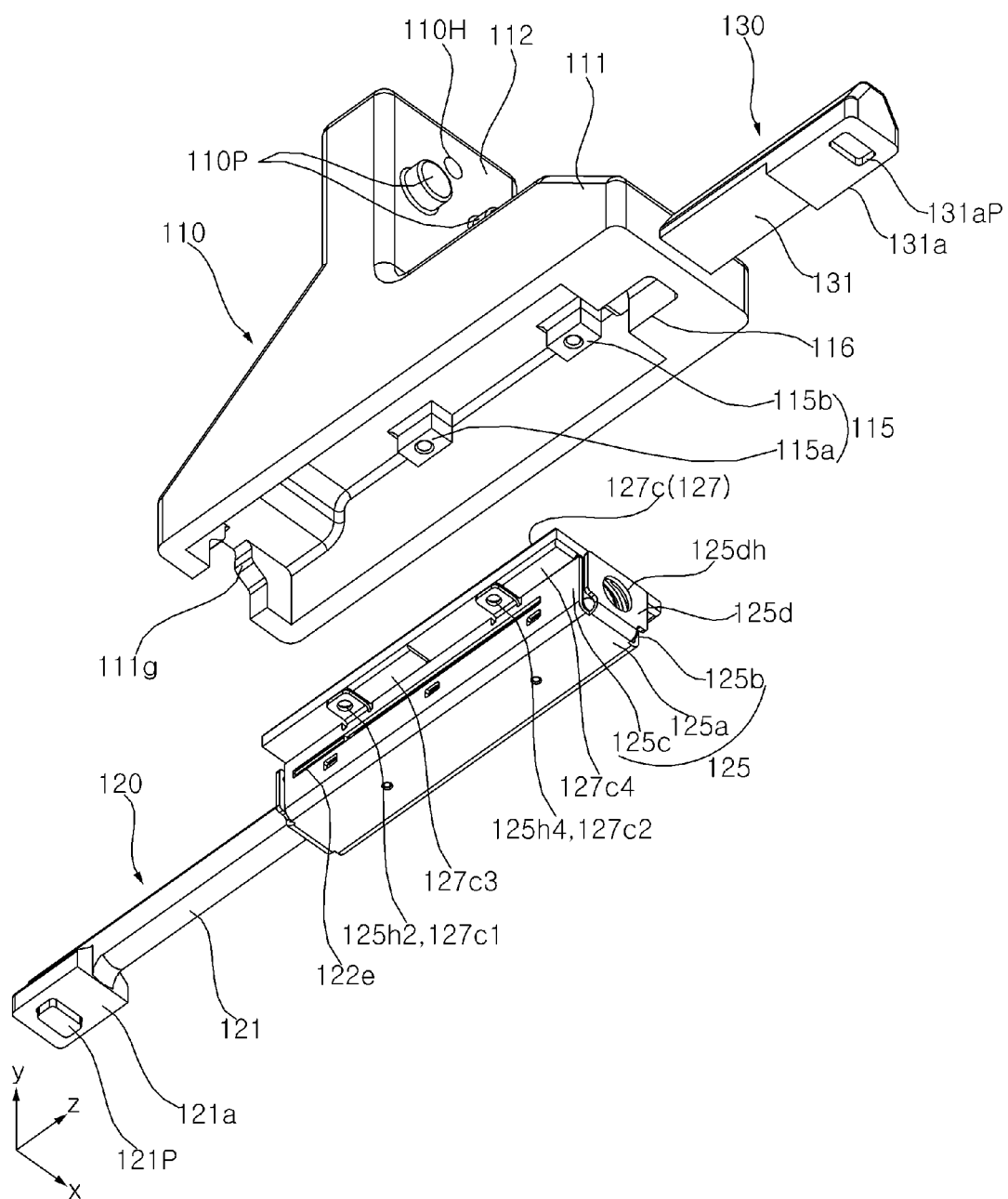

Referring to FIGS. 10 and 11, first coupling parts 125*h*1 and 125*h*3 may protrude leftward from an upper end of the first side part 125*b*. Second coupling parts 125*h*2 and 125*h*4 may protrude rightward from an upper end of the second side part 125*c*.

A guide plate 127 may be disposed between the bracket 125 and a lower surface of the support part 111 of the first body 110. A first plate 127*b* and a second plate 127*c* of the guide plate 127 may be disposed opposite each other with respect to a central portion 127*a* of the guide plate 127. First coupling holes 127*b*1 and 127*b*2 may be formed in the first plate 127*b* and may be formed between the first coupling parts 125*h*1 and 125*h*3 and first fastening parts 115*a* and 115*b*. Second coupling holes 127*c*1 and 127*c*2 may be formed in the second plate 127*c* and may be formed between the second coupling parts 125*h*2 and 125*h*4 and second fastening parts 115*c* and 115*d* (see FIG. 7).

Accordingly, a fastening member, such as a screw, may pass through the coupling parts 125*h*1, 125*h*3, 125*h*2, and 125*h*4 and coupling holes 127*b*1, 127*b*2, 127*c*1, and 127*c*2, to be fastened to the fastening members 115*a*, 115*b*, 115*c*, and 115*d*.

First guide protrusions 127*b*3 and 127*b*4 (see FIG. 12) may be formed on a lower surface of the first plate 127*b* and may be adjacent to the first coupling parts 125*h*1 and 125*h*3 in the front-rear direction. Second guide protrusions 127*c*3 and 127*c*4 may be formed on a lower surface of the second plate 127*c* and may be adjacent to the second coupling parts 125*h*2 and 125*h*4 in the front-rear direction.

Accordingly, the coupling parts 125*h*1, 125*h*3, 125*h*2, and 125*h*4 may be easily aligned with the coupling holes 127*b*1, 127*b*2, 127*c*1, and 127*c*2 by the guide protrusions 127*b*3 and 127*b*4.

The first part 122*a* of the slider 122 may be disposed between the first plate 127*b* and the second plate 127*c*. That is, a distance between the first plate 127*b* and the second plate 127*c* may be equal to or greater than a thickness of the first part 122*a* of the slider 122. Accordingly, the slider 122 may pass through a portion between the first plate 127*b* and the second plate 127*c*. Meanwhile, the portion between the first plate 127*b* and the second plate 127*c* may be referred to as a guide slot of the guide plate 127.

Figure 12:
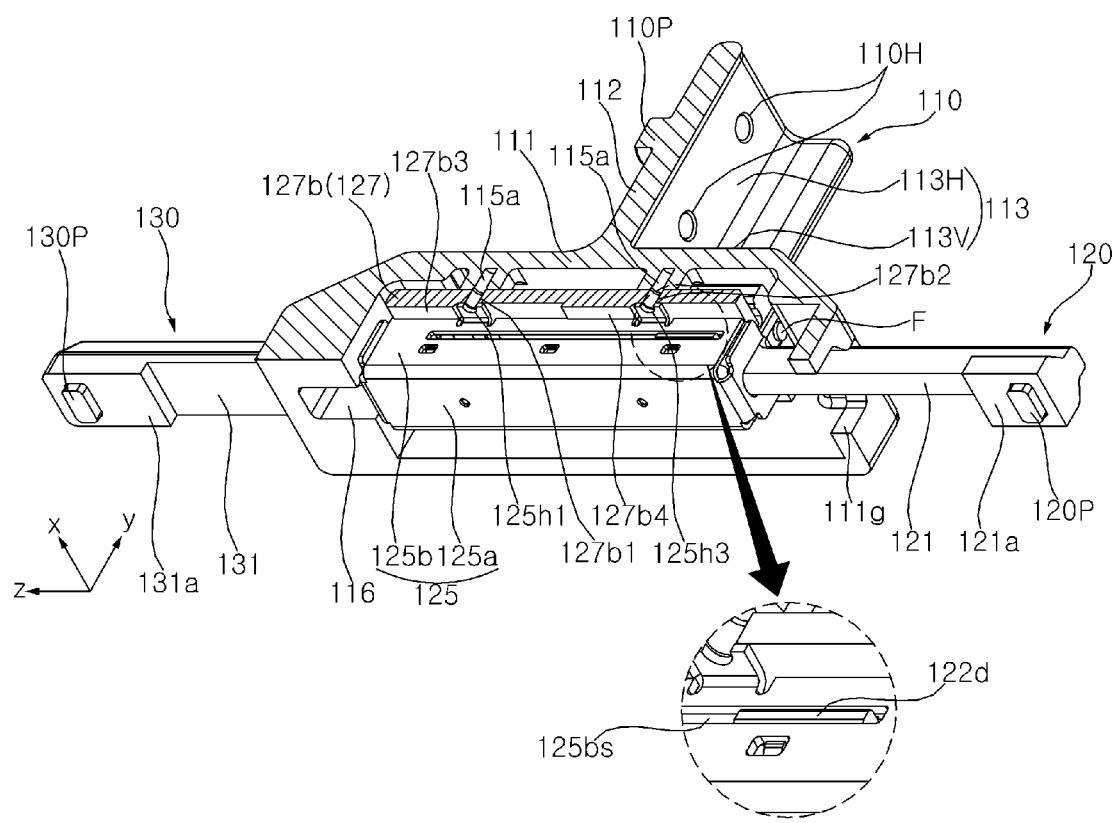
Figure 13:
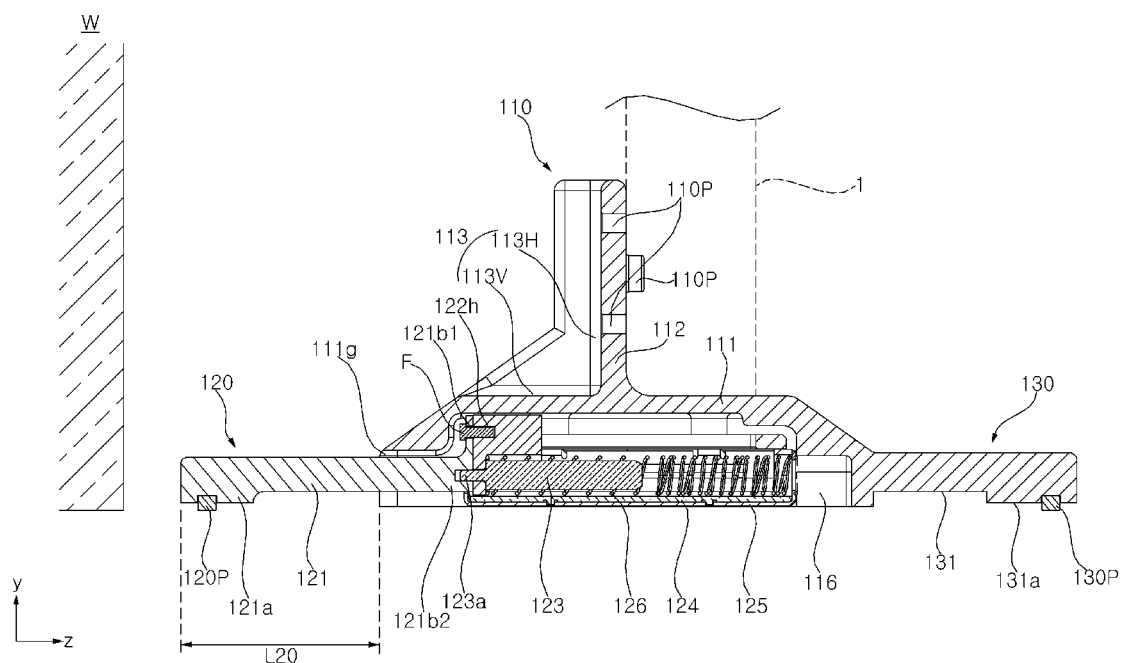

Referring to FIGS. 12 and 13, when the rear leg 121 is disposed away from a wall W, a portion of the rear leg 121 may protrude outward from the slot 111*g* by a predetermined length L20. In this case, the first protrusion 122*d* may be adjacent to a rear end of the first groove 125*bs*, and the rod 123 may not be disposed in the recess 116.

Accordingly, the rear leg 121 and the front leg 131 may be balanced with respect to the first body 110. The stand 100 may stably support the head 1 coupled to the stand 100.

Figure 14:
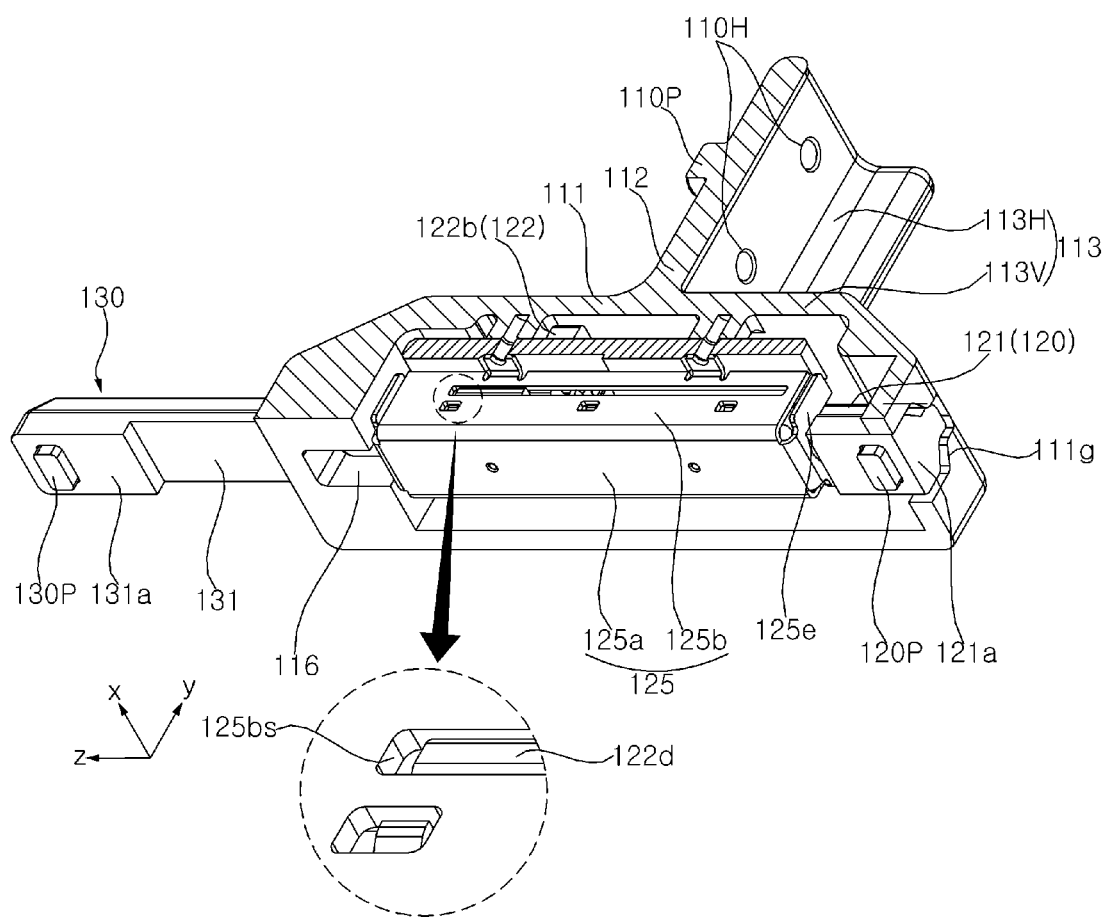
Figure 15:
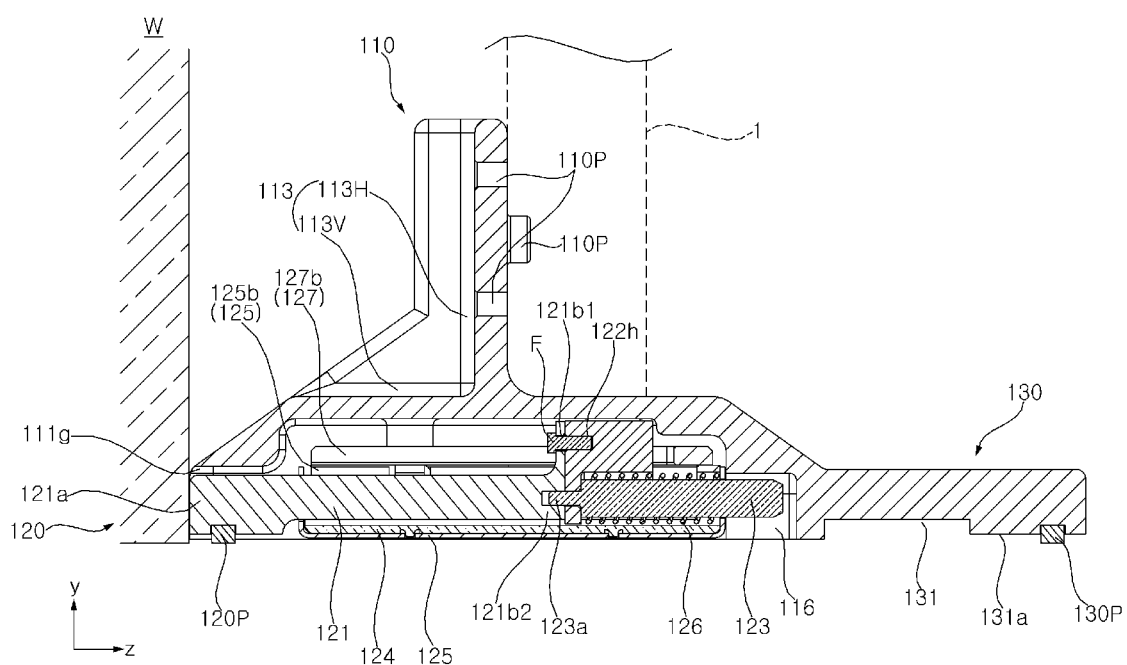

Referring to FIGS. 14 and 15, when the rear leg 121 comes into contact with the wall W, at least a portion of the rear leg 121 may be inserted into the slot 111*b*, and the elastic member 126 may be compressed. In this case, in response to an extent of insertion of the rear leg 121 into the slot 111*g*, the first protrusion 122*d* may be moved from a rear end of the first groove 125*bs* to a front end thereof. In addition, when the rear leg 121 is inserted into the slot 111*g* to the maximum, the first protrusion 122*d* may be adjacent to the front end of the first groove 125*bs*, and a portion of the rod 123 may be disposed in the recess 116.

Accordingly, a distance between the head 1 and the wall W may decrease. In addition, even when the rear leg 121 is disposed in the first body 110, the wall W may stably support the stand 100.

As the stand 100 is gradually moved away from the wall W, the elastic member 126 may be gradually stretched to its original length, and the rear leg 121 may gradually protrude to the outside of the slot 111*g* by an elastic force of the elastic member 126. Accordingly, even when the stand 110 is moved away from the wall W, the stand 100 may continue to stably support the head 1 coupled to the stand 100 and may prevent the stand 100 and the head 1 from being overturned.

Figure 16:
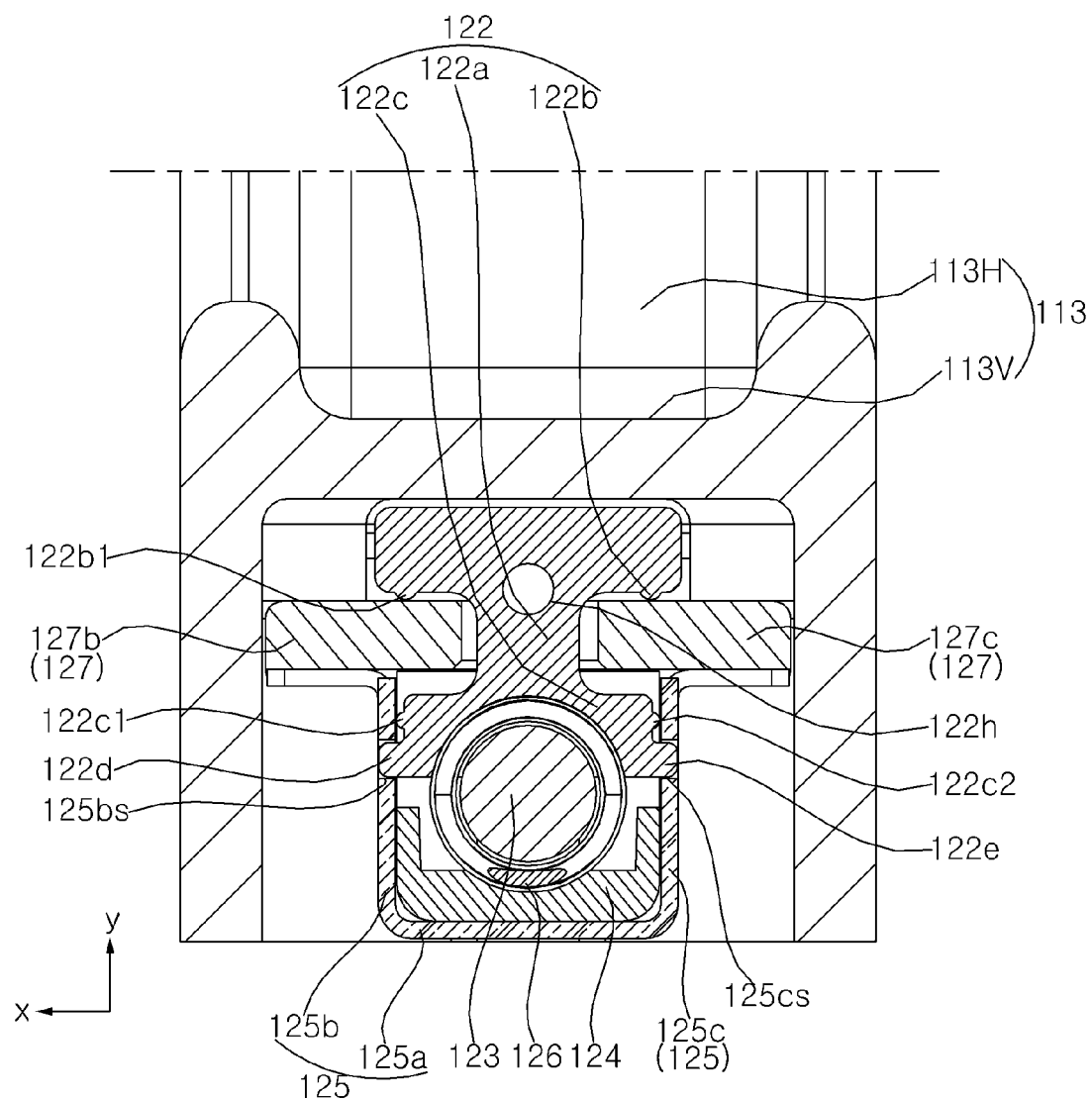

Referring to FIG. 16, the first groove 125*bs* and the second groove 125*cs* may guide forward and backward movement of the first protrusion 122*d* and the second protrusion 122*e*.

A first boss 122*c*1 may be adjacent to the first protrusion 122*d* and may protrude from the third part 122*c* of the slider 122 toward the first side part 125*b* of the bracket 125. A second boss 122*c*2 may be adjacent to the second protrusion 122*e* and may protrude from the third part 122*c* of the slider 122 toward the second side part 125*c* of the bracket 125. Accordingly, the first boss 122*c*1 and the second boss 122*c*2 may make a line contact with an inside of the bracket 125, thereby reducing a friction load between the slider 122 and the bracket 125, and allowing smooth sliding of the slider 122.

A first under-boss 122*b*1 may protrude from a lower surface of the second part 122*b* of the slider 122 toward the first plate 127*b* of the guide plate 127. A second under-boss 122*b*2 may protrude from the lower surface of the second part 122*b* of the slider 122 toward the second plate 127*c* of the guide plate 127. Accordingly, the first under-boss 122*b*1 and the second under-boss 122*b*2 may make a line contact with an upper surface of the guide plate 127, thereby reducing a friction load between the slider 122 and the guide plate 127, and allowing smooth sliding of the slider 122.

Figure 17:
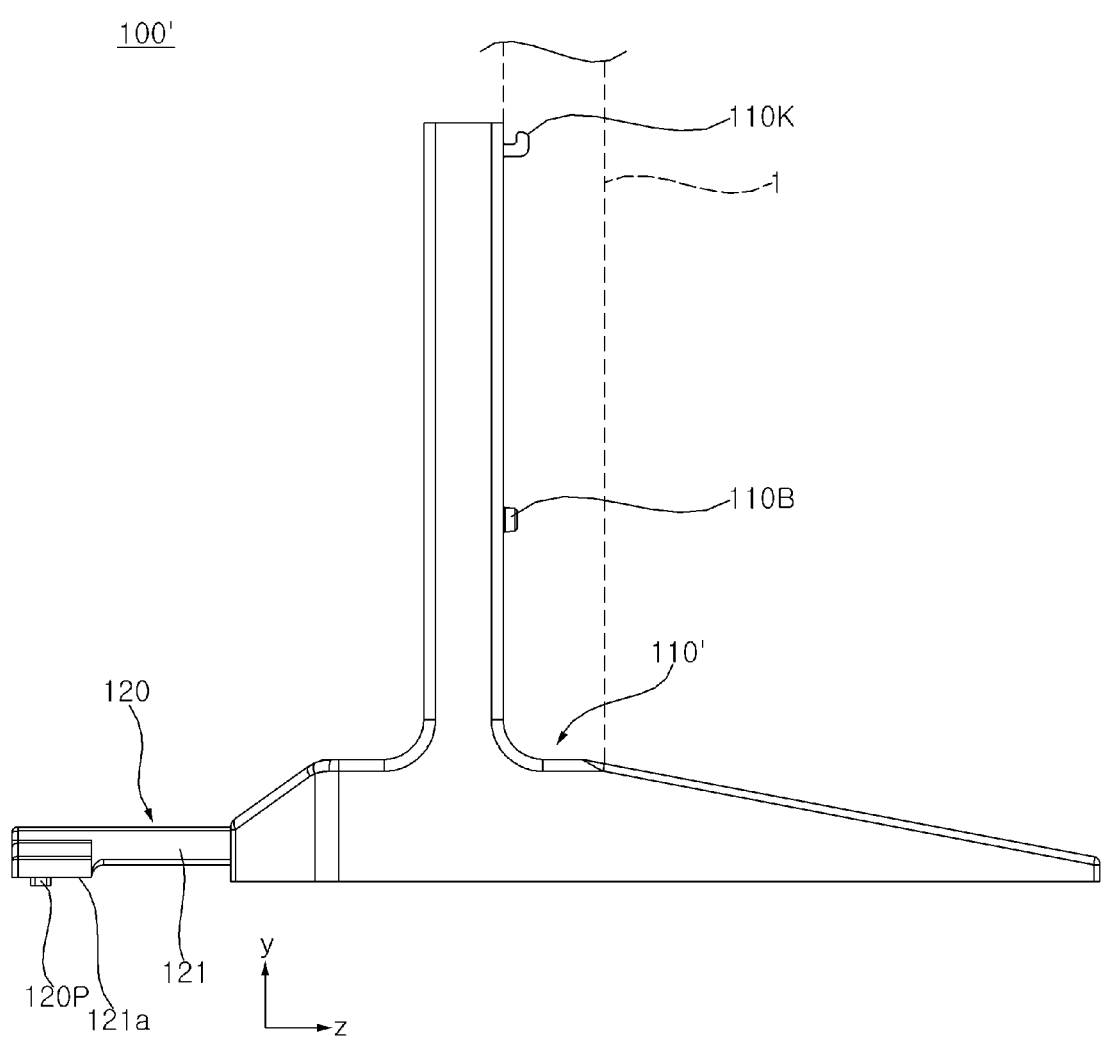

Referring to FIGS. 1 and 17, a stand 100' may be adjacent to the bottom side of the back cover 60 (see FIGS. 2 and 4) to be coupled to the back cover 60 and may support the display device 1. The stand 100' may be provided as a part of the display device 1, and the display device 1, excluding the stand 100', may be referred to as a head 1.

For example, the stand 100' may include a plurality of stands which are spaced apart from each other along the bottom side of the back cover 60. A first stand may be adjacent to the bottom side and the left side of the back cover 60, and a second stand may be adjacent to the bottom side and the right side of the back cover 60. Accordingly, the stand 100 may stably support the head 1.

Figure 18:
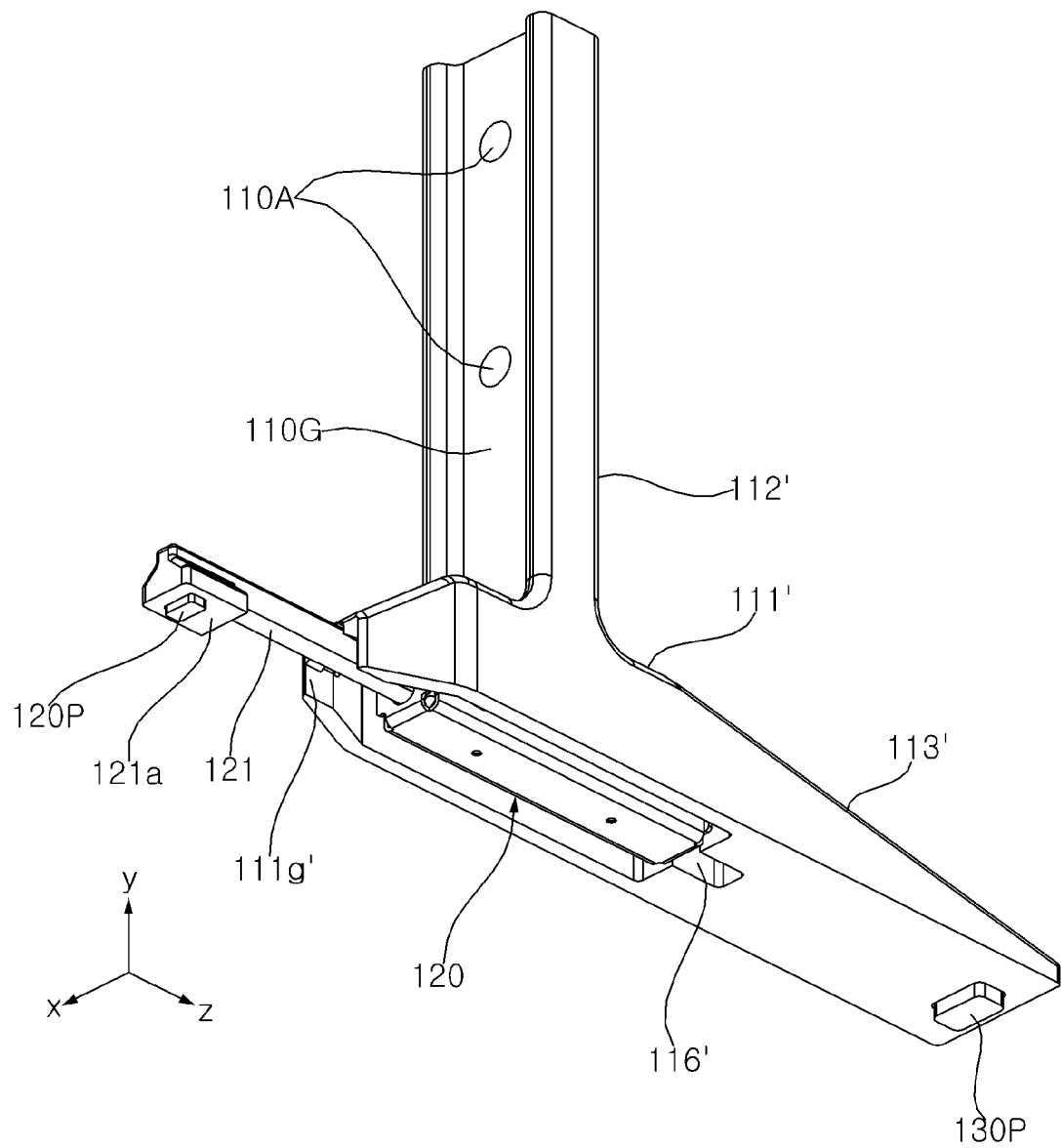
Figure 19:
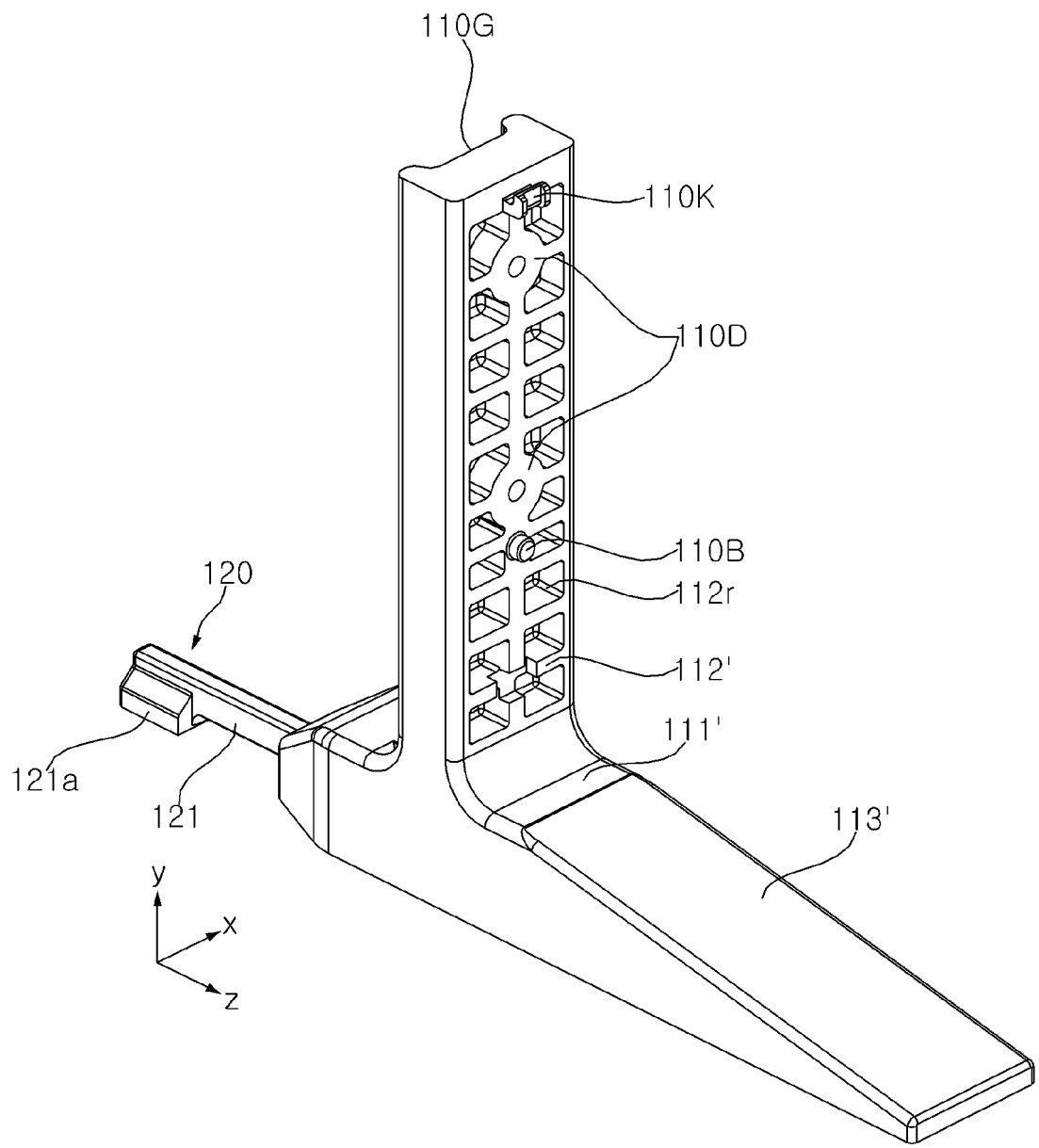

Referring to FIGS. 18 and 19, the stand 100' may include a body 110' and a sliding assembly 120.

A support part 111' of the body 110' may extend in the front-rear direction. A lower side of the support part 111' may be open and may include a slot 111*g*' and a recess 116'. A coupling part 112' of the body 110' may extend upward from an upper end of the support part 111'. A groove 110G may be formed at a position where the support part 111' and the coupling part 112' meet each other.

A portion 113' of the support part 111' and the rear leg 121 of the sliding assembly 120 may be balanced with respect to the coupling part 112'. The portion 113' of the support part 111' may be referred to as a front leg 113'.

The sliding assembly 120 may be coupled to the inside of the support part 111', and the rear leg 121 may pass through the slot 111*g*'.

A guide pin 110B may protrude forward from a front surface of the coupling part 112'. A guide hook 110K may protrude forward from the front surface of the coupling part 112' and may be spaced apart from the guide pin 110B. A coupling hole 110D may be formed between the guide pin 110B and the guide hook 110K and may pass through the coupling part 112' in the front-rear direction.

Accordingly, the guide pin 110B and the guide hook 110K may be inserted into the back cover 60 (see FIGS. 2 and 4) of the head 1, and may guide coupling between the coupling part 112' and the back cover 60. A fastening member, such as a screw, may pass through the coupling hole 110D to be fastened to the back cover 60.

Figure 20:
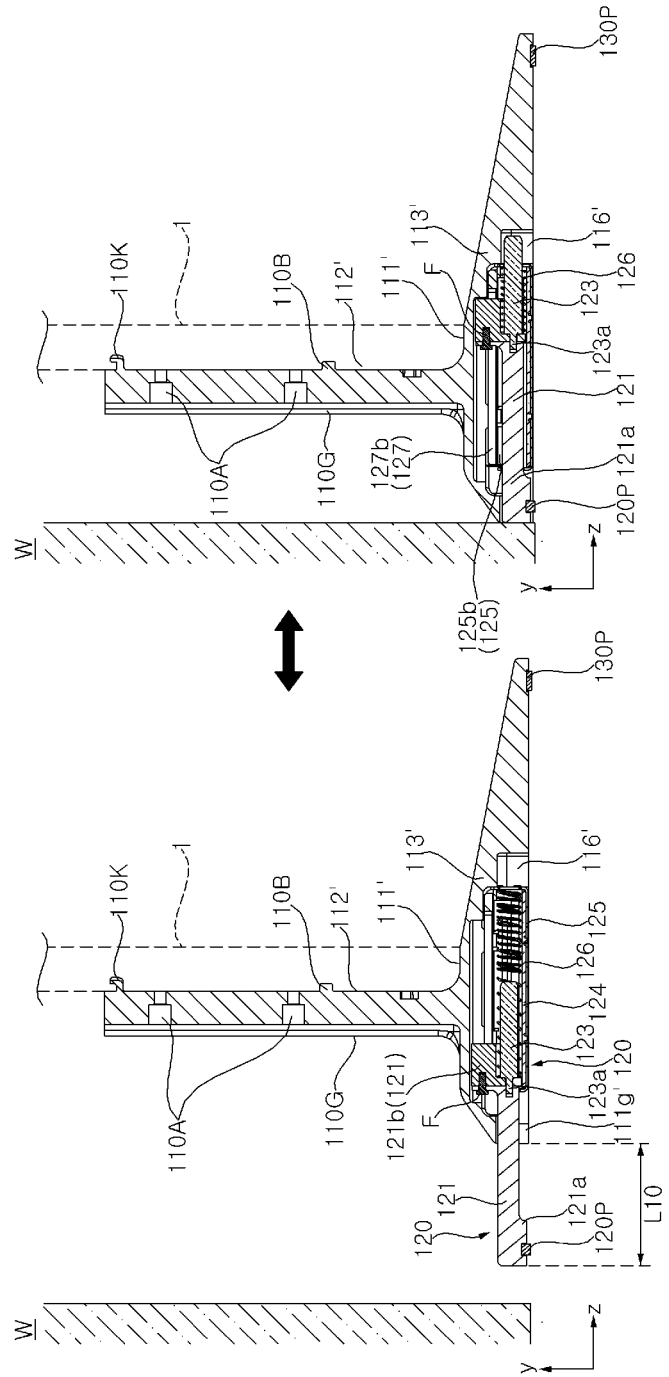

Referring to FIG. 20, when the rear leg 121 is disposed away from the wall W, a portion of the rear leg 121 may protrude to the outside of the slot 111*g*' by a predetermined length L10. The rear leg 121 and the front leg 113' may be balanced with respect to the coupling part 112'. The stand 100' may stably support the head 1 coupled to the stand 100'.

As the stand 100' is in contact with the wall W and is moved closer to the wall W, the rear leg 121 may be inserted into the slot 111*g*', and the elastic member 126 may be compressed. Accordingly, a distance between the head 1 and the wall W may decrease. The wall W may stably support the stand 100.

As the stand 100', while in contact with the wall W, is moved further away from the wall W, the rear leg 121 may protrude to the outside of the slot 111*g*' by an elastic force of the elastic member 126. In this case, the stand 100' may continue to stably support the head 1 coupled to the stand 100', and may prevent the stand 100' and the head 1 from being overturned.

Referring to FIGS. 1 to 20, according to an aspect of the present disclosure, a display device may include: a head having a display panel; and a stand disposed adjacent to a first side of the head and supporting the head, wherein the stand may include: a body coupled to the head, the body having a front leg that protrudes forward from the body; a rear leg protruding rearward from the body; and an elastic member disposed between the rear leg and the front leg, coupled to the rear leg, and being stretchable in a front-rear direction.

The display device may further include a rod protruding forward from a front end of the rear leg, wherein at least a portion of the elastic member may be wound in a coil shape around an outer surface of the rod.

The display device may further include: a slider disposed between the rear leg and the elastic member, and coupled to the rear leg and the rod; and a bracket accommodating the slider and having a groove that extends in a longitudinal direction of the rod, wherein the slider may include a protrusion protruding from the slider toward the groove and inserted into the groove.

The slider may further include a boss disposed adjacent to the protrusion, protruding from the slider toward an inside of the bracket, and making a line contact with the inside of the bracket.

The display device may further include a guide plate disposed between the bracket and an inside of the body, the guide plate having a guide slot in which a portion of the slider is disposed, wherein the bracket and the guide plate may be coupled to the inside of the body.

The slider may include: a first part disposed in the guide slot; a second part extending from the first part in a direction intersecting the first part, and covering a portion of one side of the guide plate; and an under-boss protruding from the second part toward the one side of the guide plate, and making a line contact with the one side of the guide plate.

The bracket may further include a coupling part coupled to the inside of the body, wherein the guide plate may further include: a coupling hole aligned with the coupling part; and a guide protrusion formed on one surface of the guide plate and being adjacent to the coupling part.

The display device may further include a bracket disposed opposite to the inside of the body with respect to the rod and having a bracket hole aligned with the rod, wherein the body may include a recess facing the rod through the bracket hole.

The display device may further include a guide frame disposed between the rod and the bracket, and having a frame hole aligned with the bracket hole, wherein a rear end of the elastic member may be fixed to a portion where the frame hole of the guide frame is formed, wherein the guide frame may cover at least a portion of an outside of the elastic member, and may be detachably coupled to the bracket.

The display device may further include: a front foot protruding from the front leg in a direction intersecting the front leg; and a rear foot protruding from the rear leg and disposed on a same plane as the front foot.

The display device may further include: a front pad protruding from the front foot in a direction in which the front foot protrudes from the front leg; and a rear pad protruding from the rear foot in a direction in which the rear foot protrudes from the rear leg, wherein the front pad and the rear pad may include a buffer material.

The head may include: a frame coupled to the display panel; and a back cover covering a rear side of the frame, wherein the body may be disposed adjacent to a bottom side of the back cover and may be coupled to a rear surface of the back cover.

The body may further include: a coupling part coupled to the rear surface of the back cover; and a support part extending in a direction intersecting the coupling part, and disposed between the rear leg and the front leg, the support part having an opening which is formed in a lower surface of the support part, and in which the elastic member is disposed.

The support part may include a groove through which the rear leg passes, wherein the front leg and the support part may be formed as one body.

The coupling part may further include: a guide pin protruding forward from a front surface of the coupling part, and inserted into the rear surface of the back cover; and a coupling hole formed by passing through the coupling part, and facing the rear surface of the back cover.

The display device according to the present disclosure has the following effects.

According to at least one of the embodiments of the present disclosure, there is provided a display device including a stand for supporting a head having a display panel.

According to at least one of the embodiments of the present disclosure, as the stand is in contact with a wall and is moved closer to the wall, a distance between the head and the wall may decrease.

According to at least one of the embodiments of the present disclosure, as the stand, while in contact with the wall, is moved further away from the wall, a sliding assembly of the stand which is in contact with the wall may become longer.

According to at least one of the embodiments of the present disclosure, an elastic deformation mechanism of the stand may be provided.

According to at least one of the embodiments of the present disclosure, a coupling structure of the head and the stand may be provided.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

What is claimed is:

1. A display device comprising:
a head having a display panel; and
a stand disposed adjacent to a first side of the head and supporting the head,
wherein the stand comprises:
   a body coupled to the head, the body having a front leg that protrudes forward from the body;
   a rear leg protruding rearward from the body;
   an elastic member disposed between the rear leg and the front leg, coupled to the rear leg, and being stretchable in a front-rear direction;
   a rod protruding forward from a front end of the rear leg; and
   a guide frame covering at least a portion of an outside of the elastic member, and having a frame hole aligned with the rod in a direction in which the elastic member is compressed,
wherein at least a portion of the elastic member is wound in a coil shape around an outer surface of the rod, and
wherein at least part of the rod passes through the frame hole as the elastic member is compressed.

2. A display device comprising:
a head having a display panel; and
a stand disposed adjacent to a first side of the head and supporting the head,
wherein the stand comprises:
   a body coupled to the head, the body having a front leg that protrudes forward from the body;
   a rear leg protruding rearward from the body;
   an elastic member disposed between the rear leg and the front leg, coupled to the rear leg, and being stretchable in a front-rear direction;
   a rod protruding forward from a front end of the rear leg;
   a slider disposed between the rear leg and the elastic member, and coupled to the rear leg and the rod; and
   a bracket accommodating the slider and having a groove that extends in a longitudinal direction of the rod, wherein at least a portion of the elastic member is wound in a coil shape around an outer surface of the rod, and wherein the slider has a protrusion protruding from the slider toward the groove and inserted into the groove.

3. The display device of claim 2, wherein the slider further comprises a boss disposed adjacent to the protrusion, protruding from the slider toward an inside of the bracket, and making a line contact with the inside of the bracket.

4. The display device of claim 2, further comprising a guide plate disposed between the bracket and an inside of the body, the guide plate having a guide slot in which a portion of the slider is disposed, wherein the bracket and the guide plate are coupled to the inside of the body.

5. The display device of claim 4, wherein the slider further comprises:

a first part disposed in the guide slot;

a second part extending from the first part in a direction intersecting the first part, and covering a portion of one side of the guide plate; and an under-boss protruding from the second part toward the one side of the guide plate, and making a line contact with the one side of the guide plate.

6. The display device of claim 4, wherein the bracket further comprises a coupling part coupled to the inside of the body, wherein the guide plate further comprises:

a coupling hole aligned with the coupling part; and a guide protrusion formed on one surface of the guide plate and being adjacent to the coupling part.

7. The display device of claim 1, further comprising a bracket disposed opposite to an inside of the body with respect to the rod and having a bracket hole aligned with the rod, wherein the body has a recess facing the rod through the bracket hole.

8. The display device of claim 7, wherein the guide frame is disposed between the rod and the bracket, and the frame hole is aligned with the bracket hole, wherein a rear end of the elastic member is fixed to a portion where the frame hole of the guide frame is formed, wherein the guide frame is detachably coupled to the bracket.

9. The display device of claim 1, further comprising:

a front foot protruding from the front leg in a direction intersecting the front leg; and a rear foot protruding from the rear leg and disposed on a same plane as the front foot.

10. The display device of claim 9, further comprising:

a front pad protruding from the front foot in a direction in which the front foot protrudes from the front leg; and a rear pad protruding from the rear foot in a direction in which the rear foot protrudes from the rear leg, wherein the front pad and the rear pad include a buffer material.

11. A display device comprising:

a head having a display panel; and a stand disposed adjacent to a first side of the head and supporting the head, wherein the stand comprises:

a body coupled to the head, the body having a front leg that protrudes forward from the body:

a rear leg protruding rearward from the body;

an elastic member disposed between the rear leg and the front leg, coupled to the rear leg, and being stretchable in a front-rear direction;

a frame coupled to the display panel; and a back cover covering a rear side of the frame, wherein the body is disposed adjacent to a bottom side of the back cover and is coupled to a rear surface of the back cover, and wherein the body further comprises:

a coupling part coupled to the rear surface of the back cover; and a support part extending in a direction intersecting the coupling part, and disposed between the rear leg and the front leg, the support part having an opening which is formed in a lower surface of the support part, and in which the elastic member is disposed.

12. The display device of claim 11, wherein the support part has a groove through which the rear leg passes, wherein the front leg and the support part are formed as one body.

13. The display device of claim 11, wherein the coupling part further comprises:

a guide pin protruding forward from a front surface of the coupling part, and inserted into the rear surface of the back cover; and a coupling hole formed by passing through the coupling part, and facing the rear surface of the back cover.

\* \* \* \* \*